United States Patent [19]

Sykes et al.

[11] Patent Number: 5,377,825
[45] Date of Patent: Jan. 3, 1995

[54] COMPACT DISC STORAGE CASE

[76] Inventors: Philip K. Sykes, 209 Stonecliffe Aisle, Irvine, Calif. 92715; Dennis B. Barnett, 321 Catalina Dr., Newport Beach, Calif. 92663

[21] Appl. No.: 183,629

[22] Filed: Jan. 18, 1994

Related U.S. Application Data

[63] Continuation of Ser. No. 250, Jan. 4, 1993, abandoned.

[51] Int. Cl.$^6$ ............................................. B65D 85/57
[52] U.S. Cl. ................................... 206/232; 206/310; 206/313
[58] Field of Search ............... 206/444, 307, 309, 310, 206/311, 312, 313, 232; 312/9.41, 9.42, 9.43, 9.44, 9.58, 9.64

[56] References Cited

U.S. PATENT DOCUMENTS

| | | | |
|---|---|---|---|
| 4,511,034 | 4/1985 | Pan | 206/312 X |
| 4,535,888 | 8/1985 | Nusselder | 206/444 |
| 4,793,479 | 12/1988 | Otsuka et al. | 206/309 X |
| 4,874,085 | 10/1989 | Grobecker et al. | 206/311 X |

*Primary Examiner*—Jacob K. Ackun, Jr.
*Attorney, Agent, or Firm*—Leonard Tachner

[57] ABSTRACT

A CD storage case made of polypropylene injection molded plastic in a foldable configuration, which when fully assembled, is generally a flat, square box. The box comprises six sides comprising bottom and top panels, two side panels, a front panel and a rear hinge panel, the latter being provided with a pair of living hinges to permit the folding and unfolding of the box. The top and bottom panel are provided with hubs, each adapted for receiving a compact disc, whereby when fully closed, the CD storage case houses two compact discs in opposed spaced parallel relation, each firmly secured on its own respective hub. Each top and bottom panel provides a support segment which consists of a short, curved wall positioned along the interior surface of each panel, a distance from the center of the hub slightly greater than the radius of the disc. Each such panel provides four such support segments spaced symmetrically around the hub and which cooperate with the top surface of the hub to provide a support for documentation. The present invention provides storage for up to two compact discs and associated documentation in a manner which prevents any surface contact between the discs or between the documentation and the discs.

3 Claims, 4 Drawing Sheets

COMPACT DISC STORAGE CASE

This is a continuation of copending application(s) Ser. No. 08/000,250 filed on Jan. 4, 1993 now abandoned.

BACKGROUND OF THE INVENTION

1. Field of the Invention

The present invention pertains generally to the art of storage containers for compact discs and more specifically to a compact disc storage case capable of storing two such discs and attendant documentation such as a brochure or a libretto and the like, while preventing the brochure from coming in contact with the surfaces of the discs.

2. Prior Art

The music recording business has undergone a virtual revolution over the last decade, whereby the grooved phonograph record containing analog reproducible music has been entirely displaced by the compact disc with digital reproduction capability. More recently, the field of compact discs has grown even further by the introduction of other forms of media on such discs, such as compact disc read only memory storage for computers, compact disc read only memory full motion video and compact discs for interactive computerized video games. Most compact disc audio recordings are sold in a polystyrene clear plastic case, commonly referred to as the "jewel box". The currently available version of the jewel box suitable for storing a single compact disc is a brittle see-through plastic, three piece hinged device which can be easily broken when dropped on a hard surface or inadvertantly mishandled. There are also such jewel boxes available for storing two CD's, which is a necessity for storing long musical compositions that cannot be recorded on one 70 minute capacity disc, such as show music, operas and the like. The jewel box currently available for storing two CD's is a rather complex and cumbersome arrangement of five different pieces of brittle plastic, including a center page-like piece which may be used to store a third or fourth compact disc or hold a brochure, libretto or the like. Unfortunately, such two compact disc jewel boxes suffer from a number of disadvantages. One such disadvantage has already been mentioned above, namely the delicate brittleness of the plastic that is used, which can easily crack or shatter if dropped on a hard surface. Another such disadvantage is the complexity of assembly and of use, resulting from the cumbersome configuration of the various plastic pieces that go into making a two CD storage case. Another significant disadvantage is the high likelihood that any brochure stored within such a two CD storage jewel box will come in contact with the surface of at least one such CD, which may result in inadvertant scratching or other forms of damage to the CD, particularly if the CD is inadvertantly stored in a reversed position with the indicia side down and the clear side directed toward the brochure within the jewel box.

The aforementioned disadvantages of the current standard two CD jewel box configuration will become even more significant in the future as the requirement for dual CD storage becomes more prolific. Dual CD storage will in fact become more common as more and more of the public begin to use CD ROM components, such as CD ROM full motion video and CD ROM based video games. In fact, a significant future potential market for such new compact disc formats will be the rental market, the logistics of which will probably be similar to the current video rental market. As in the video rental market, the original media storage case supplied by the manufacturer will be inadequate to withstand the harsh treatment to which videos and soon to be CDs will be subjected by repeated rental, where an easily broken or damaged jewel box would be entirely inadequate. Thus, there is a need for a rugged, relatively unbreakable and certainly re-useable form of secure CD storage case, particularly for storage of two CD's and preferably a storage case which permits inclusion of a relatively large brochure instruction manual, libretto, etc. which can be positioned within the storage case, without coming in contact with the surfaces of the CDs. Unfortunately, there is no available prior art known to the applicant which solves the aforementioned need. By way of example, U.S. Pat. No. 4,709,812 to Kosterka discloses, particularly in FIG. 6 thereof, a compact disc package capable of storing two compact discs. This patent discloses the use of a paperboard sheet, folded in a configuration and adhesively connected or affixed to a conventional plastic CD retaining device. Thus unfortunately, this particular prior art lacks the ruggedness and security previously alluded to. Furthermore, there is no disclosed method of storing a fairly large brochure, instruction manual or the like, within the package that would be spaced from the CD's surfaces, as herein above described.

U.S. Pat. No. 3,949,872 to Paudras is designed to protect phonograph records and is of a generally square or rectangular configuration, using a molded lid and body and having a centering pin and annular bearing zones to hold the record in a suspended configuration, protected from external forces, as well as moisture and scratching.

U.S. Pat. No. 4,084,690 to Pulse discloses a device similar in shape to that disclosed in the Paudras patent, but is designed to hold a video disc, relying on a center post structure, a portion of which is attached to each of the base and cover members, each such portion having an arcuate peripheral surface of appropriate shape and dimension to nest within the central aperture of the video disc which is secured thereby.

U.S. Pat. No. 4,903,829 to Clemmens is again a similar structure designed for containing a compact disc. However, again this is designed to house only one such disc. It uses annular protrusions with a base portion to seat the disc and an annular ring in the lip portion designed to hold it down in a manner shown best in FIGS. 2 and 4 therein.

Based upon the foregoing, it will be seen that there is no current prior art which satisfies the aforementioned need for providing a rugged, durable, two-CD storage case which also affords the added advantage of supporting a relatively large brochure and the like, therein, but spaced from the surfaces of the CDs.

SUMMARY OF THE INVENTION

The present invention comprises a CD storage case made of rugged polypropelene injection molded plastic in a foldable configuration, which when fully assembled, is generally a flat, square box. The box has six sides comprising bottom and top panels, two side panels, a front panel and a rear hinge panel, the latter being provided with a pair of living hinges to permit the folding and unfolding of the box. The top and bottom panel are provided with hubs, each such hub adapted for receiving a compact disc, whereby when fully closed, the CD storage case of the present invention houses two compact discs in opposed spaced parallel relation, each firmly secured on its own respective hub. Furthermore, each such top and bottom panel provides a support segment which consists of a short, curved wall positioned along the interior surface of each panel, a distance from the center of the hub slightly greater than the radius of the disc. Each such panel provides four such support segments spaced symmetrically around the hub and which cooperate with the top surface of the hub to provide a support for documentation such as a libretto for musical CDs or a biography of a performer or composer or an instruction manual for an interactive CD and the like. Thus, the present invention provides storage for two compact discs and associated documentation in a manner which prevents any surface contact between the discs or between the documentation and the discs. The storage box of the present invention, comprises relatively damage resistant resilient (i.e., non-brittle) plastic material which will not crack or break when dropped on a hard surface. In addition, the present invention is made of a one-piece injection molded plastic construction which requires no assembly and which can securely support two compact discs and associated documentation. This highly secure arrangement can withstand significant abuse without permitting any damage to the contents thereof.

OBJECTS OF THE INVENTION

It is therefore a principal object of the present invention to provide a compact disc storage case for storing one or two compact discs and their associated documentation in a secure rugged container which can withstand a significant amount of abuse such as encountered in rental applications.

It is an additional object of the present invention to provide a compact disc storage case especially suited for storing two compact discs and associated documentation such as an instruction manual, a libretto or a biography of a composer or the like, wherein neither of the two discs, nor the documentation contacts one another, thereby avoiding any surface damage to the discs during storage.

It is still an additional object of the present invention to provide a CD storage case capable of storing two compact discs and their associated documentation, the discs being stored on opposed hubs of a fully enclosed, resilient, injection-molded polypropelene plastic box made of a one-piece construction, thereby obviating any requirement for manufacturing assembly.

It is still an additional object of the present invention to provide a two CD storage case having structural features which permit inclusion of a significant amount of documentation, but spaced from the surfaces of either compact disc to prevent damage thereto during transport and the like.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment, when taken in conjunction with the following drawings in which.

DETAILED DESCRIPTION OF A PREFERRED EMBODIMENT

Figure 1:
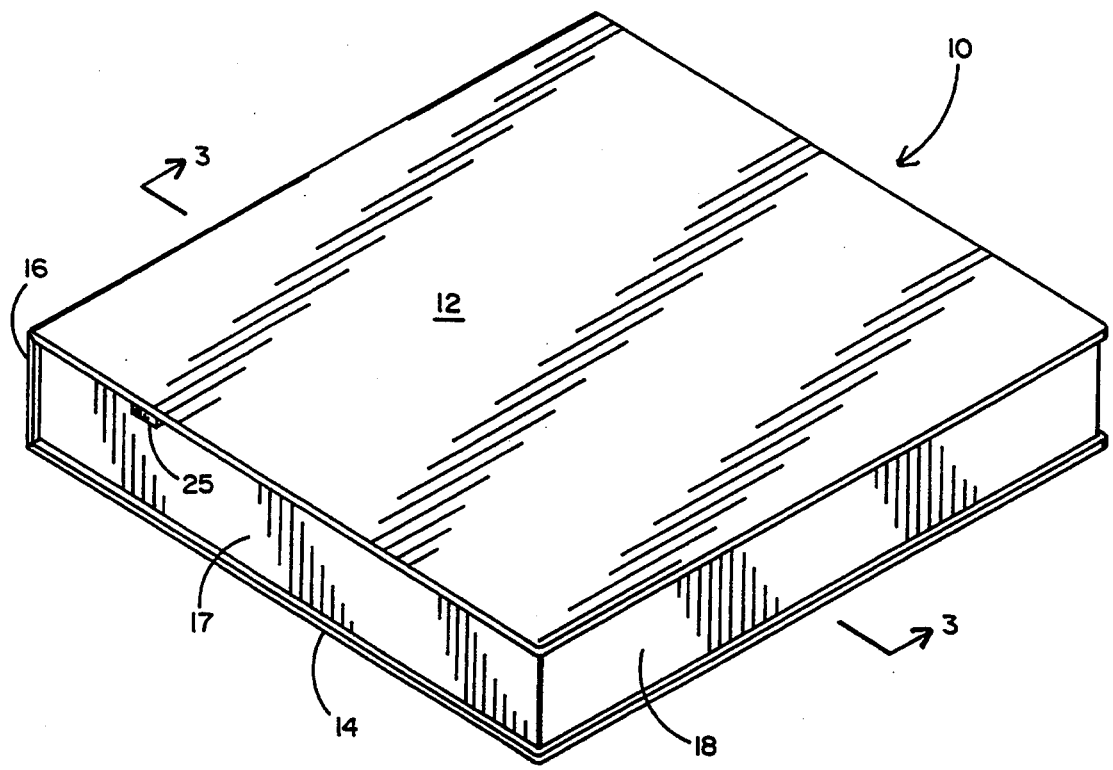
FIG. 1 is an isometric drawing of the present invention shown in its fully closed configuration.
Figure 2:
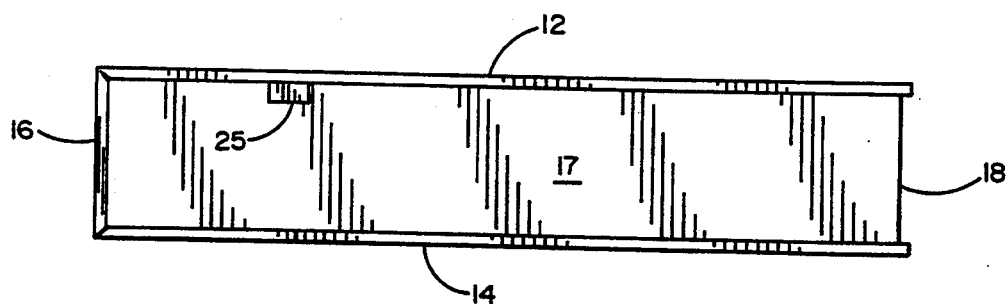
FIG. 2 is a side plan view of the present invention shown in its fully closed configuration.
Figure 3:
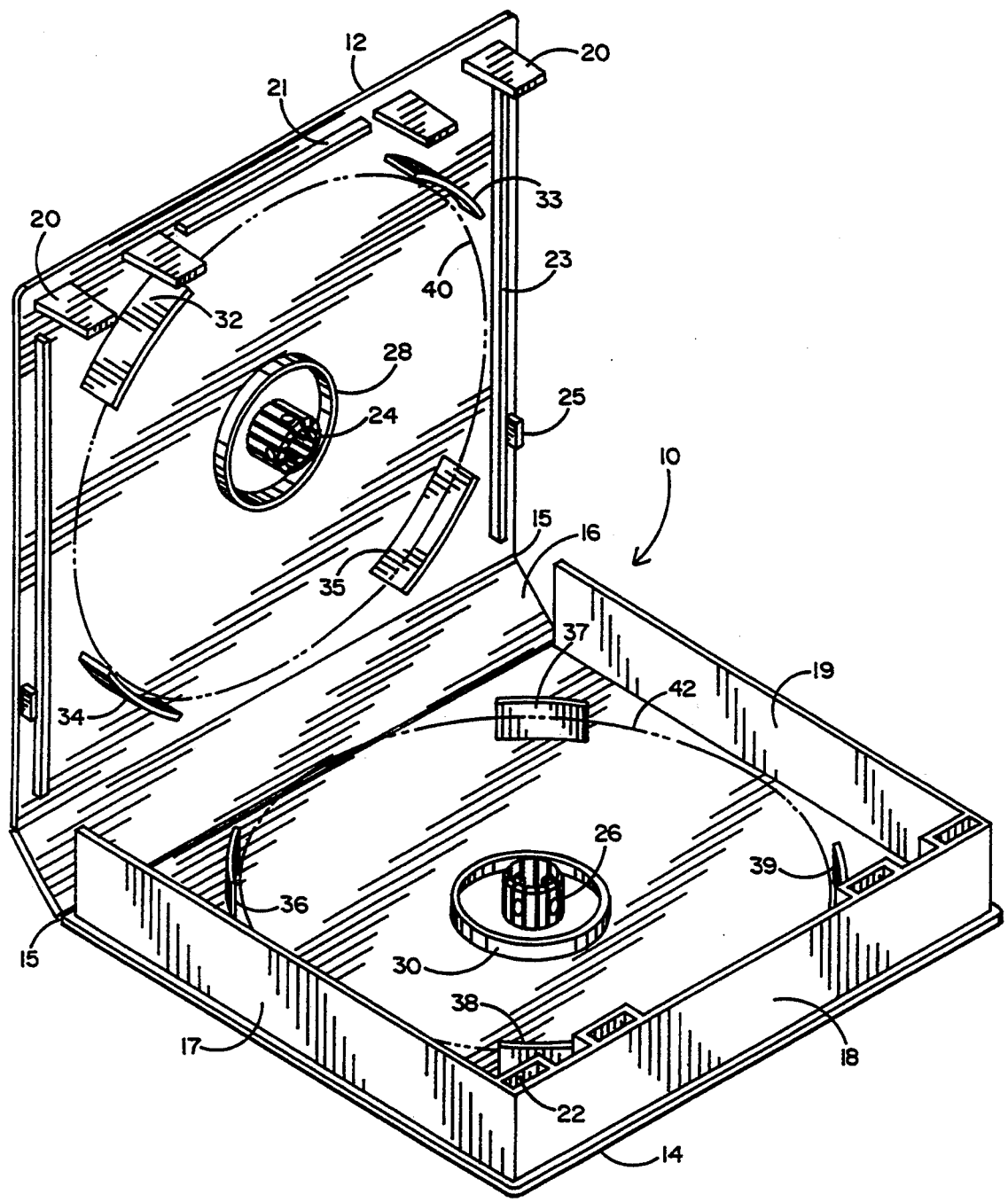
FIG. 3 is an isometric view of the present invention shown in its open configuration.

Referring now to the accompanying figures and specifically FIGS. 1 through 3 thereof, it will be seen that the CD storage case 10 of the present invention comprises a top panel 12 and a bottom panel 14, both connected to a hinge panel 16 by means of a pair of living hinges 15. Case 10 also comprises side panels 17 and 19 and a front panel 18. The top panel 12 is provided with four tongues 20, while the bottom panel 14 is provided with four corresponding rectangular shaped grooves 22, adapted to receive the tongues 20 when the box is closed for securing the top and bottom panels in parallel spaced relation. Secure closure of the case 10 is also assured by means of a front lip 21, a pair of side lips 23 and a pair of tabs 25, all provided on the top panel 12. These elements provide secure closure of the case 10. More specifically, lip 21 is designed to frictionally engage front panel 18 along the interior surface thereof, and lips 23 and tabs 25 are designed to engage the side panel 17 and 19 on interior and exterior surfaces thereof, respectively, to provide an extremely secure closure of the case 10 for protection of the compact discs contained therein. As seen further in FIG. 3, the top panel 12 is provided with a hub 24 and a CD support ring 28. Similarly, the bottom panel 14 provides a hub 26 and a CD support ring 30, the detailed structure of which may be best understood by referring now to FIGS. 6 and 7.

Figure 6:
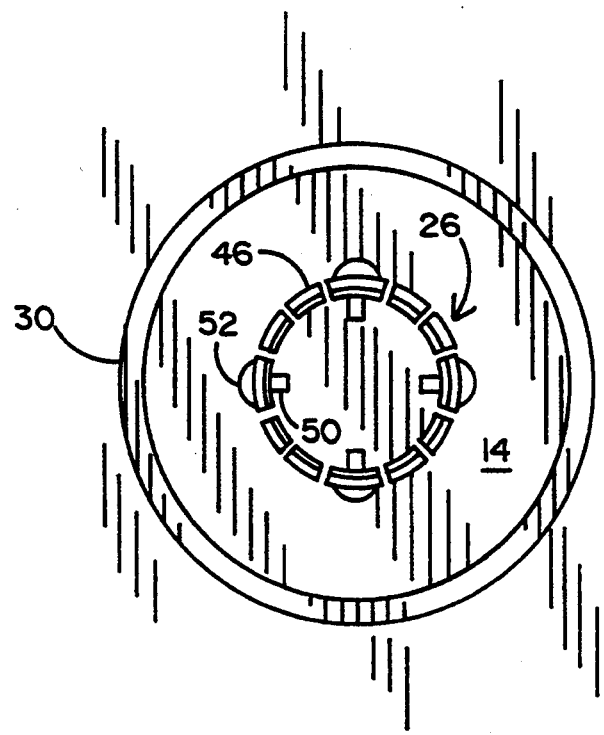
FIG. 6 is an enlarged plan view of the hub and support ring of the present invention.
Figure 7:
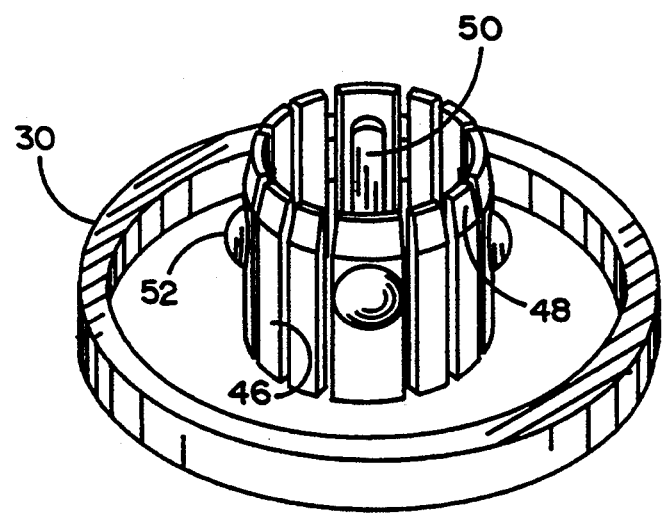
FIG. 7 is an enlarged isometric view of the hub and support ring portion shown in FIG. 6.

As seen in FIGS. 6 and 7, hub 26 comprises a plurality of fingers 46, extending perpendicularly to the underlying bottom panel 14. The fingers 46 are arranged in a circular configuration, the diameter of which being approximately equal to the inside diameter of the hole found in standard compact discs. The portion of each finger furthest from the underlying surface of bottom panel 14 has an angled surface 48 which is analagous to a chamferred surface for simplifying the insertion of a compact disc onto the hub. As seen best in FIG. 6, four of the fingers 46 are provided with reinforcement ribs 50 on the inside of the hub and circular knobs 52 on the outside of the hub. The ribs 50 provide structural reinforcement to minimize the permissible compression of those fingers reinforced by the ribs under the stress of a compact disc engaging the fingers. The circular knobs 52 on those same fingers which are reinforced by ribs 50, provide a means for securing the compact disc on the hub, beneath the knobs, so that the disc cannot be inadvertantly released by the hubs without manual intervention. Such manual intervention is in the form of bending the fingers inwardly toward the center of the hub and particularly the fingers upon which there is a circular knob 52, while applying a withdrawing force to the compact disc. Thus, while the hub of the present invention is designed to secure the compact disc and prevent inadvertant release therefrom, it is still relatively simple to manually remove the compact disc from the hub when so desired.

Returning now to FIG. 3, it will be seen that each of the top and bottom panels 12 and 14, respectively, further comprises four support segments, each in the shape of a small segment of a ring and each extending upwardly in a direction perpendicular to the panel from which it extends. More specifically, the top panel 12 provides support segments 32, 33, 34 and 35, while bottom panel 14 provides support segments 36, 37, 38 and 39. It will be seen in FIG. 3 that each such segment on the respective surface of the top panel 12 and bottom panel 14 is spaced symmetrically from the other segments and that each is spaced equidistantly from the center of the corresponding hub 24 or 26, respectively.

Figure 4:
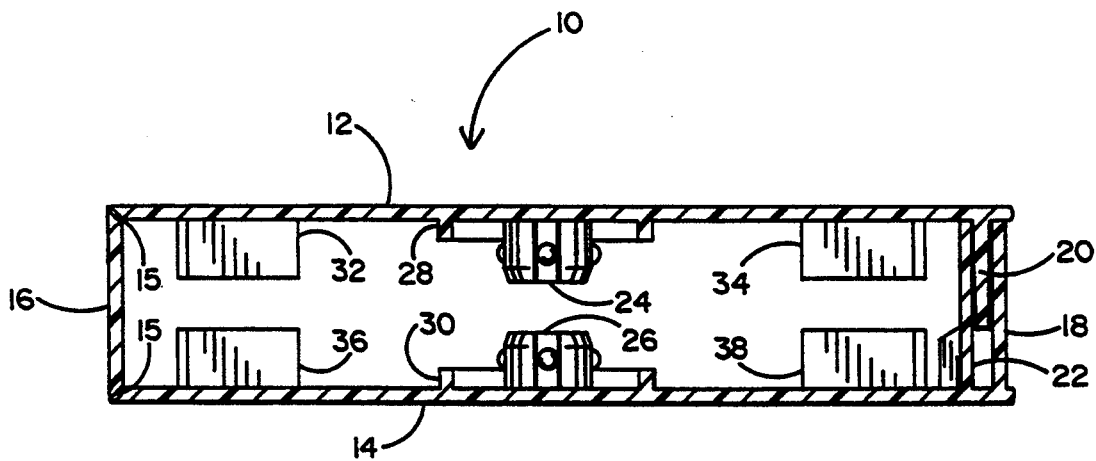
FIG. 4 is a cross-sectional diagram of the present invention shown in its closed configuration.

As seen best in FIG. 4, the support segments 32 through 39 on the respective panels 12 and 14, are positioned to be substantially aligned in opposing relationship. Furthermore, it will be seen that each is of a height which is substantially equivalent to the height of the corresponding hub on the same panel surface. Thus for example, in FIG. 4, it will be seen that the support segments 32 and 36 are significantly aligned in spaced relation on the top panel 12 and bottom panel 14, respectively and the same can be said for the opposed support segments 34 and 38 of the same two panels. Furthermore, it will be seen that support segments 32 and 34, extending from the inside surface of the top panel 12 are substantially the same height or distance from the panel as the hub 24 and the same can be said of the segments 36 and 38, with respect to hub 26.

Figure 5:
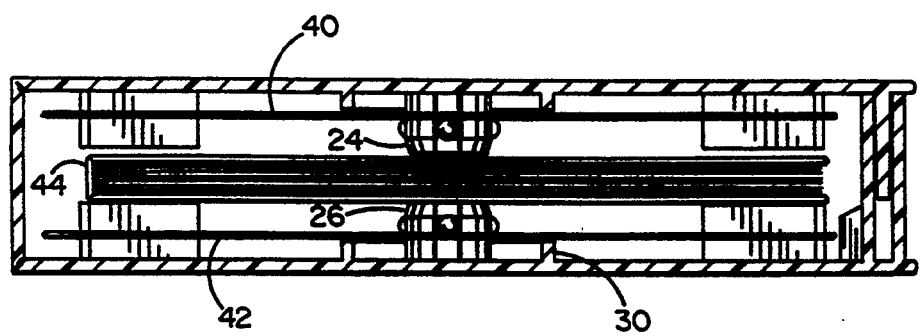
FIG. 5 is a drawing similar to that of FIG. 4, but showing the case of the present invention housing a pair of compact discs and supporting documentation.

The manner in which the CD storage case 10 of the present invention actually supports a pair of compact discs and their supporting documentation is shown best in FIG. 5. In addition, the storage positions of a pair of compact discs are shown in phantom in FIG. 3, wherein it will be seen that a first compact disc 40 is secured to the hub 24 of top panel 12, while a second compact disc 42 is secured to hub 26 of the bottom panel 14. As seen best in FIG. 5, these two compact discs 40 and 42 are positioned on their respective hubs 24 and 26, captured on the fingers 46 of each such hub between the circular knobs 52 thereof and the facing surface of the CD support ring 28 or 30, respectively. In their captured positions, each such CD 40 and 42 is thus spaced from the inside surface of the corresponding panel 12 and 14, as well as being spaced from one another. In addition, as seen in FIG. 5, a brochure 44 which is shown therein as a representative example of documentation which may accompany the two compact discs 40 and 42, is positioned between the opposed surfaces of the support segments 32 through 39, as well as the opposed ends of the hub 24 and 26. It will be seen that in this supported position, the documentation 44 is separated from both CDs 40 and 42. Furthermore, it will be seen that because of the position and shape of the support segments 32 through 39, the documentation cannot come in contact with the surface of either CD, irrespective of the orientation of the case 10.

Thus, it will be seen that the present invention provides a CD storage case for one or two compact discs and their supporting documentation. Furthermore, it will be seen that the present invention provides a very rugged, secure, relatively unbreakable and inexpensively produced resilient plastic box for storing up to two compact discs and their supporting documentation in spaced relation so that neither of the discs can come in contact with either the storage case or the documentation along any critical surface at which any form of damage could interfere with the recovery of data from the disc.

Those having skill in the art to which the present invention pertains, will now as a result of the applicant's teaching herein, perceive various modifications and additions which may be made to the invention. By way of example, the specific materials disclosed herein, as well as the precise shape and dimension of the various components thereof, may be readily altered without deviating from the advantageous results disclosed herein. Accordingly, all such modifications and additions are deemed to be within the scope of the invention which is to be limited only by the claims appended hereto and their equivalents.

I claim:

1. A container for enclosing at least one compact disc of the type used for storing digital information recoverable by operation of a laser producing light incident on the disc surface between inner and outer radial disc edges; the container comprising:

a unitary, injection-molded plastic housing having at least one substantially planar interior surface and having a plurality of integral flexible fingers extended perpendicularly from said planar interior surface; said fingers being arranged in an annular configuration to form a hub for receiving said inner radial edge of said disc in press fit engagement therewith, at least one of said fingers having an outwardly radially disposed integral knob formed below an upper surface of said finger; said planar interior surface also having an integral support ring extending perpendicularly therefrom and disposed in spaced symmetrical relation about said hub to receive said disc surface, the height of said support ring above said interior planar surface being less than the height of said knob above said interior planar surface for securing said disc between said ring and said knob in spaced parallel relation to said planar interior surface; and a plurality of curved documentation support members spaced from said ring and also extending integrally from said interior planar surface, each of said documentation support members being elongated and having a height above said interior planar surface for supporting overlying documentation in a position spaced from said disc to prevent contact between said documentation and said disc within said container.

2. A container for enclosing at least one compact disc of the type used for storing digital information recoverable by operation of a laser producing light incident on the disc surface between inner and outer radial disc edges; the container comprising:

a unitary, injection-molded plastic housing having at least one substantially planar interior surface, a pair of side panels, a frontal panel, a rear panel and having a plurality of integral flexible fingers extended perpendicularly from said planar interior surface; said fingers being arranged in an annular configuration to form a hub for receiving said inner radial edge of said disc in press fit engagement therewith, at least one of said fingers having an outwardly radially disposed integral knob formed below an upper surface of said finger; said planar interior surface also having an integral support ring extending perpendicularly therefrom and disposed in spaced symmetrical relation about said hub to receive said disc surface, the height of said support ring above said interior planar surface being less than the height of said knob above said interior planar surface for securing said disc between said ring and said knob in spaced parallel relation to said planar interior surface; and a plurality of curved documentation support members spaced outwardly from said ring, and inwardly from said side, frontal and rear panels and also extending integrally from said interior planar surface, each of said documentation support members being elongated and having a height above said interior planar surface for supporting overlying documentation in a position spaced from said disc to prevent contact between said documentation and said disc within said container.

3. A container for enclosing at least one compact disc of the type used for storing digital information recoverable by operation of a laser producing light incident on the disc surface between inner and outer radial disc edges; the container comprising:

a unitary, injection-molded plastic housing having at least one substantially planar interior surface and having a plurality of integral flexible fingers extended perpendicularly from said planar interior surface; said fingers being arranged in an annular configuration to form a hub for receiving said inner radial edge of said disc in press fit engagement therewith, at least one of said fingers having an outwardly radially disposed integral knob formed below an upper surface of said finger at a first predetermined distance above said planar interior surface; said planar interior surface also having an integral support ring extending perpendicularly therefrom to a second predetermined distance above said planar interior surface, said first predetermined distance being greater than said second predetermined distance, and disposed in spaced symmetrical relation about said hub to receive said disc surface, the height of said support ring above said interior planar surface being less than the height of said knob above said interior planar surface for securing said disc between said ring and said knob in spaced parallel relation to said planar interior surface; and a plurality of curved documentation support members spaced from said ring and also extending integrally from said interior planar surface, each of said documentation support members being elongated and having a height above said interior planar surface greater than said first predetermined distance of said knob above said planar interior surface for supporting overlying documentation in a position spaced from said disc to prevent contact between said documentation and said disc within said container.

* * * * *